United States Patent
Mao et al.

(10) Patent No.: US 9,582,059 B2
(45) Date of Patent: Feb. 28, 2017

(54) USB INTERFACE POWER SUPPLY METHOD AND POWER SUPPLY DEVICE FOR TIME DIVISION MULTIPLE ACCESS LOAD SYSTEM

(71) Applicant: ZTE CORPORATION, Shenzhen, Guangdong Province (CN)

(72) Inventors: Jianhua Mao, Shenzhen (CN); Yuqiang Lai, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 200 days.

(21) Appl. No.: 14/396,844

(22) PCT Filed: Aug. 22, 2013

(86) PCT No.: PCT/CN2013/082041
§ 371 (c)(1),
(2) Date: Oct. 24, 2014

(87) PCT Pub. No.: WO2014/075480
PCT Pub. Date: May 22, 2014

(65) Prior Publication Data
US 2015/0127960 A1    May 7, 2015

(30) Foreign Application Priority Data

Nov. 19, 2012 (CN) .......................... 2012 1 0470472

(51) Int. Cl.
*G06F 1/32* (2006.01)
*H02M 3/156* (2006.01)
*H02M 1/36* (2007.01)

(52) U.S. Cl.
CPC ............... *G06F 1/32* (2013.01); *H02M 1/36* (2013.01); *H02M 3/156* (2013.01)

(58) Field of Classification Search
CPC ............ G06F 1/32; H02M 1/36; H02M 3/156
See application file for complete search history.

(56) References Cited

U.S. PATENT DOCUMENTS 7,075,909 B1 * 7/2006 Iinuma .................. H04W 52/50
370/329
8,148,954 B1    4/2012 Kehlstadt et al.
(Continued)

FOREIGN PATENT DOCUMENTS

BE    EP 2290794 A1 *    3/2011 ............ H02M 3/156
CN    101436425 A    5/2009
(Continued)

OTHER PUBLICATIONS

Full English (machine) translation of CN101969192 (Published Sep. 9, 2010).
(Continued)

*Primary Examiner* — Thomas Lee
*Assistant Examiner* — Mohammad A Rahman
(74) *Attorney, Agent, or Firm* — McClure, Qualey & Rodack, LLP (57) ABSTRACT

A USB interface power supply method and power supply device for a time division multiple access load system reduce costs of using the capacitance while guaranteeing the performance. The USB interface power supply device includes: a USB interface, a soft-start circuit and a DC-DC direct current conversion circuit that are connected in sequence, wherein, an output of the DC-DC direct current conversion circuit supplies power to the time division multiple access load system. The power supply device also includes a capacitor, wherein: a first end of the capacitor is connected between the soft-start circuit and the DC-DC direct current conversion circuit, a second end of the capacitor is set to be grounded, and the capacitor is used for
(Continued)

limiting an input current of the DC-DC direct current conversion circuit.

8 Claims, 3 Drawing Sheets

(56) References Cited

U.S. PATENT DOCUMENTS

| | | | |
|---|---|---|---|
| 8,872,491 B2 | 10/2014 | Takano et al. | |
| 2003/0214273 A1 | 11/2003 | Mah et al. | |
| 2009/0267571 A1* | 10/2009 | Wolf | G06F 1/26 |
| | | | 320/162 |
| 2010/0295379 A1 | 11/2010 | Garcia | |
| 2011/0208981 A1 | 8/2011 | Kou et al. | |
| 2013/0176876 A1* | 7/2013 | Wakayama | H04W 72/048 |
| | | | 370/252 |

FOREIGN PATENT DOCUMENTS

| | | |
|---|---|---|
| CN | 101777789 A | 7/2010 |
| CN | 101969192 A | 9/2010 |
| CN | 102545568 A | 7/2012 |
| EP | 1445780 A1 | 8/2004 |
| EP | 2290794 A1 | 3/2011 |
| JP | 2010193615 A | 9/2010 |
| JP | 2012059050 A | 3/2012 |

OTHER PUBLICATIONS

Full English (machine) translation of CN101777789 (Published Jul. 14, 2010).
English Abstract translation of CN101436425 (Published May 20, 2009).
JP Office Action dated Feb. 8, 2016 in corresponding JP application (2015-511929).
European Search Report dated Jul. 15, 2015 in corresponding EP Application No. 13854479.3-1805 / 2830204.

* cited by examiner

USB INTERFACE POWER SUPPLY METHOD AND POWER SUPPLY DEVICE FOR TIME DIVISION MULTIPLE ACCESS LOAD SYSTEM

TECHNICAL FIELD

The present application relates to the field of communication technology, and specifically, to a Universal Serial Bus (USB) interface power supply method and power supply device for a time division multiple access road system.

BACKGROUND OF THE RELATED ART

More and more types of USB data terminal products appear, with the promotion of data rate, the increase of functions and the increment of power consumption, a terminal with a USB interface has higher power supply requirements for the USB interface. According to the requirements of the USB communication protocol, the standard power supply current of the USB interface of the computer is 500 mA, in order to guarantee the security of interface power supply, a limited current circuit is set in all power supply circuits of the terminal products, the object is to protect that an output voltage of the USB power supply interface does not drop below a safe value, and there are basically two current-limiting ways, one is to perform current limiting at an output terminal of a Direct Current (DC)-DC converter, requirements of such current-limiting way for the output current ability of the DC-DC converter are not high, that is, the direct current converter with a low output current ability is appropriate when adopting this way; and the other one is to perform current limiting at an input terminal of the DC-DC converter, such current-limiting way is suitable for the output current ability being very high so that the current output by the converter individually can satisfy the demand of current when a time division multiple access load system bursts in working, and it is required to keep a working voltage of the input terminal of the converter not drop or drop a bit.

When the time division multiple access load system works in a burst mode, the instantaneous high current requires that a large capacitance with a certain capacity must be set in the terminal circuit to perform energy compensation, which makes voltages of a USB interface terminal and a load terminal not drop excessively.

In current-limiting ways of the input terminal of the traditional DC-DC converter, a voltage value of the USB protocol specification is not considered with regard to the selection of current-limiting components.

SUMMARY OF THE INVENTION

The technical problem required to be solved by the present application is to provide a USB interface power supply method and power supply device for a time division multiple access load system, which reduces costs of using the capacitance while guaranteeing the performance.

In order to solve the above technical problem, the present application provides a USB interface power supply device for a time division multiple access load system, which comprises: a USB interface, a soft-start circuit and a DC-DC direct current conversion circuit that are connected in sequence, wherein, an output of the DC-DC direct current conversion circuit supplies power to the time division multiple access load system, characterized in that, the power supply device further comprises a capacitor, wherein:

a first end of the capacitor is connected between the soft-start circuit and the DC-DC direct current conversion circuit, a second end of the capacitor is set to be grounded, and the capacitor is used for limiting an input current of the DC-DC direct current conversion circuit; a capacitance value of the capacitor is decided according to voltages of the capacitor when the time division multiple access load system works and does not work, a maximum current allowed to be output by the USB interface, an input voltage of the DC-DC direct current conversion circuit, a voltage and a current required by the time division multiple access load system, and a working period of the time division multiple access load system.

Preferably, a capacitance value of the capacitor being decided according to voltages of the capacitor when the time division multiple access load system works and does not work, a maximum current allowed to be output by the USB interface, an input voltage of the DC-DC direct current conversion circuit, a voltage and a current required by the time division multiple access load system, and a working period of the time division multiple access load system comprises:

the capacitance value being obtained through calculation with the following formula:

$$C = \frac{\left(\frac{U_0 \times I_0}{U_i \times \eta} - I\right) \times T}{UC1 - UC2};$$

wherein, UC1 is an initial voltage of the capacitor when the time division multiple access load system does not work, UC2 is a voltage of the capacitor when the time division multiple access load system works, $U_0$ is the voltage required by the time division multiple access load system, $I_0$ is the current required by the time division multiple access load system, $U_i$ is the input voltage of the DC-DC direct current conversion circuit, $\eta$ is a conversion efficiency of the DC-DC direct current conversion circuit, I is the maximum current allowed to be output by the USB interface, and T is the working period of the time division multiple access load system.

Preferably, the power supply device further comprises a detection circuit and a baseband control circuit, wherein:

the detection circuit is configured to: be located between the USB interface and the soft-start circuit, and detect whether an output voltage of the USB interface is lower than a preset threshold value; and the baseband control circuit is configured to: connect with the detection circuit at one end, and connect with the time division multiple access load system at the other end, and when the detection circuit detects that the output voltage of the USB interface is lower than the preset threshold value, reduce transmission power of the time division multiple access load system.

Preferably, the capacitor comprises a capacitance group and a switch group, one end of the capacitance group serves as the first end of the capacitor, the other end of the capacitance group serves as the second end of the capacitor, and the switch group is connected with the baseband control circuit, and the switch group turns on or turns off internal switch components of the switch group to control a capacitance value of the capacitance group according to control of the baseband control circuit.

Preferably, the capacitance group comprises at least two parallel capacitances, each capacitance is connected with a switch component in series, and all switches constitute the switch group.

In order to solve the above technical problem, the present application further provides a USB interface power supply method for a time division multiple access load system, which comprises:

after soft starting, a capacitor limiting an input current of a DC-DC direct current conversion circuit, wherein a capacitance value of the capacitor is decided according to voltages of the capacitor when the time division multiple access load system works and does not work, a maximum current allowed to be output by a USB interface, an input voltage of the DC-DC direct current conversion circuit, a voltage and a current required by the time division multiple access load system, and a working period of the time division multiple access load system; and the DC-DC direct current conversion circuit performing voltage conversion, and supplying power to the time division multiple access load system.

Preferably, a capacitance value of the capacitor being decided according to voltages of the capacitor when the time division multiple access load system works and does not work, a maximum current allowed to be output by the USB interface, an input voltage of the DC-DC direct current conversion circuit, a voltage and a current required by the time division multiple access load system, and a working period of the time division multiple access load system comprises:

the capacitance value being obtained through calculation with the following formula:

$$C = \frac{\left(\frac{U_0 \times I_0}{U_i \times \eta} - I\right) \times T}{UC1 - UC2};$$

wherein, UC1 is an initial voltage of the capacitor when the time division multiple access load system does not work, UC2 is a voltage of the capacitor when the time division multiple access load system works, $U_0$ is the voltage required by the time division multiple access load system, $I_0$ is the current required by the time division multiple access load system, $U_i$ is the input voltage of the DC-DC direct current conversion circuit, $\eta$ is a conversion efficiency of the DC-DC direct current conversion circuit, I is the maximum current allowed to be output by the USB interface, and T is the working period of the time division multiple access load system.

Preferably, the method further comprises: detecting whether an output voltage of the USB interface is lower than a preset threshold value; and if the output voltage of the USB interface is lower than the preset threshold value, reducing transmission power of the time division multiple access load system.

Preferably, the method further comprises: after determining the capacitance value of the capacitor, by controlling on-off of switch components in a switch group connected with the capacitor, adjusting the capacitance value of the capacitor.

Preferably, the capacitor comprises at least two parallel capacitances, and each capacitance is connected with a switch component in series.

With the device and method of the present application, the minimum capacity of capacitance required by the input terminal of the DC-DC converter is determined by monitoring the voltage of the USB interface (not less than a standard specification value), which guarantees reliabilities of the working of the computer USB interface and working of the terminal while considering costs of the whole machine. By using the method and device of the present application, it is unnecessary to concern whether the USB interface supports the USB2.0 protocol or the USB3.0 protocol, and it is only required to consider an actual power supply ability of the USB interface, which has a practical significance of universal applications.

PREFERRED EMBODIMENTS OF THE PRESENT APPLICATION

The examples of the present application will be described in detail in combination with the accompanying drawings below. It should be noted that the examples in the present application and the characteristics in the examples can be optionally combined with each other in the condition of no conflict.

Example 1

Figure 1:
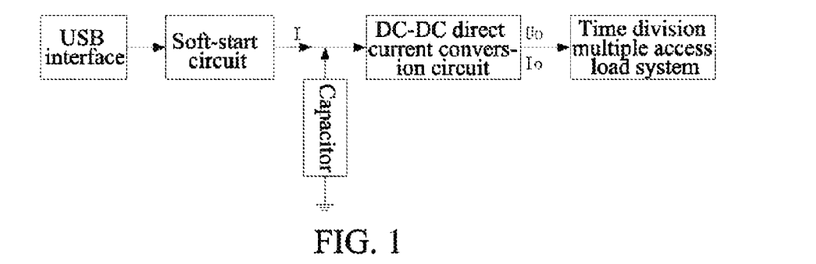
FIG. 1 is a schematic diagram of structure of a power supply device according to the example 1 of the present application.

The introduction of the example is used for a USB interface power supply device for supplying power to a time division multiple access load system, as shown in FIG. 1, the power supply device includes: a USB interface, a soft-start circuit and a DC-DC direct current conversion circuit that are connected in sequence, and the power supply device also includes a capacitor used for current limiting, and the first end of the capacitor is connected between the soft-start circuit and the DC-DC direct current conversion circuit, and the second end of the capacitor is set to be grounded, wherein:

the soft-start circuit is used for implementing soft starting;

the capacitor is used for limiting an input current of the DC-DC direct current conversion circuit, and a capacitance value of the capacitor is decided according to voltages of the capacitor when the time division multiple access load system works and does not work, a maximum current allowed to be output by the USB interface, an input voltage of the DC-DC direct current conversion circuit, a voltage and a current required by the time division multiple access load system, and a working period of the time division multiple access load system; and the output of the DC-DC direct current conversion circuit is used for supplying power to the time division multiple access load system.

Since current absorptions of different loads are different, abilities of supplying the current by power supply interfaces of different brands of computers are also different. This causes that the required capacitances are also different, and a capacitance series required to be constituted from two or more than two parallel capacitances is a capacitance group. The capacitor represents one capacitance, and it also can represent a group of capacitances namely the capacitance group.

In one preferred example, the capacitance value of the capacitor is obtained through calculation with the following formula:

$$C = \frac{\left(\frac{U_0 \times I_0}{U_i \times \eta} - I\right) \times T}{UC1 - UC2} \quad \text{formula (1)}$$

wherein, UC1 is an initial voltage of the capacitor when the time division multiple access load system does not work, UC2 is a voltage of the capacitor when the time division multiple access load system works, $U_0$ is the voltage required by the time division multiple access load system, $I_0$ is the current required by the time division multiple access load system, $U_i$ is the input voltage of the DC-DC direct current conversion circuit, $\eta$ is a conversion efficiency of the DC-DC direct current conversion circuit, I is the maximum current allowed to be output by the USB interface, and T is the working period of the time division multiple access load system. If the conversion efficiency of the DC-DC direct current conversion circuit is higher and approximate to 1, the conversion efficiency also can be ignored in the calculation of capacitances.

Various transformations of the above formula (1) are all within the protection scope of the present application. When the capacitor is implemented with one capacitance, the capacitance value of the capacitor can be obtained through calculation according to the formula (1).

Figure 2:
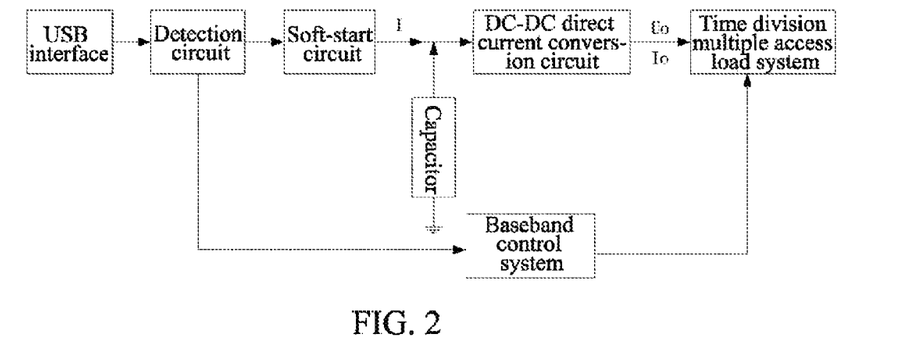
FIG. 2 is a schematic diagram of structure of the power supply device with a baseband control system according to the example 1 of the present application.

In one preferred example, the power supply device also includes a detection circuit and a baseband control circuit, as shown in FIG. 2, the detection circuit is located between the USB interface and the soft-start circuit, and it is used for detecting whether an output voltage of the USB interface is lower than a preset threshold value; one end of the baseband control circuit is connected with the detection circuit, the other end is set to connect with the time division multiple access load system, and the baseband control circuit is used for reducing the transmission power of the time division multiple access load system when the detection circuit detects that the output voltage of the USB interface is lower than the preset threshold value.

Figure 3:
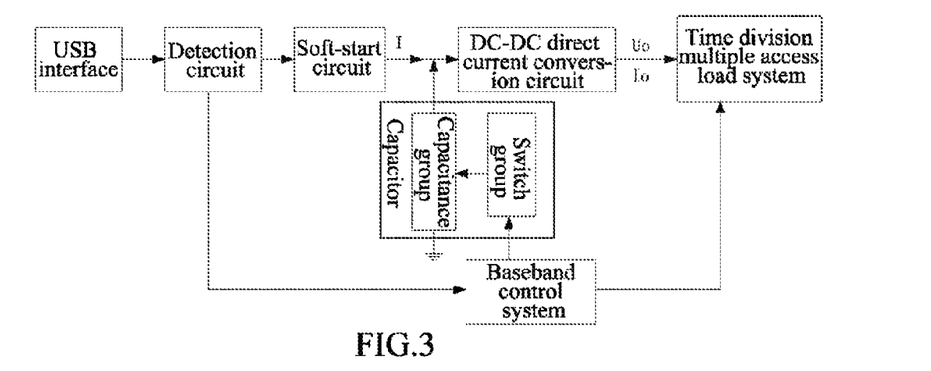
FIG. 3 is a schematic diagram of structure of the power supply device containing a capacitor according to the example 1 of the present application.

The above capacitance value of the capacitor can be designed in advance, and a capacitance group with an adjustable capacitance value also can be designed. In another preferred example, as shown in FIG. 3, the capacitor includes a capacitance group and a switch group, one end of the capacitance group serves as the first end of the capacitor, the other end of the capacitance group serves as the second end of the capacitor, and the switch group is connected with the baseband control circuit, and the switch group turns on or turns off internal switch components of the switch group to control a capacitance value of the capacitance group according to control of the baseband control circuit.

The above capacitance group includes at least two parallel capacitances, and each capacitance is connected with a switch component in series, and all switches constitute the switch group.

Example 2

Figure 4:
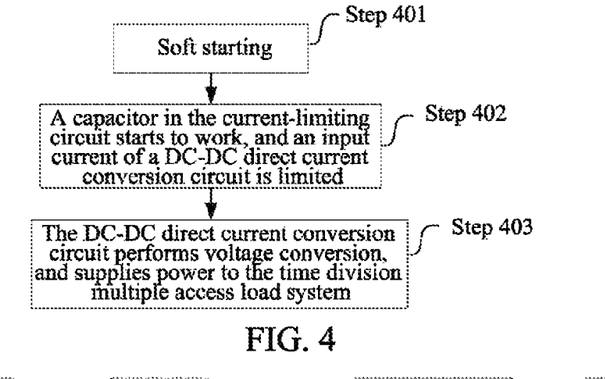
FIG. 4 is a flow diagram of the example 2 of the present application.

The introduction of the example is used for a USB interface power supply method for supplying power to a time division multiple access load system, and as shown in FIG. 4, the following steps are included.

In step 401, soft starting is performed.

In step 402, a capacitor in the current-limiting circuit starts to work, an input current of a DC-DC direct current conversion circuit is limited, and a capacitance value of the capacitor is decided according to voltages of the capacitor when the time division multiple access load system works and does not work, a maximum current allowed to be output by the USB interface, an input voltage of the DC-DC direct current conversion circuit, a voltage and a current required by the time division multiple access load system, and a working period of the time division multiple access load system.

The capacitance value of the capacitor can be calculated with the formula (1) in the above example 1, which will not be repeated here.

After determining the capacitance value of the capacitor, the capacitance value of the capacitor can be adjusted by adjusting a switch group connected with the capacitor. Specifically, the capacitor includes at least two parallel capacitances, and each capacitance is connected with a switch component in series.

In step 403, the DC-DC direct current conversion circuit performs voltage conversion, and supplies power to the time division multiple access load system.

In one preferred example, the above method also includes: detecting whether an output voltage of the USB interface is lower than a preset threshold value; and if the output voltage of the USB interface is lower than the preset threshold value, reducing the transmission power of the time division multiple access load system.

The above example will be specifically described through an application example below.

Figure 5:
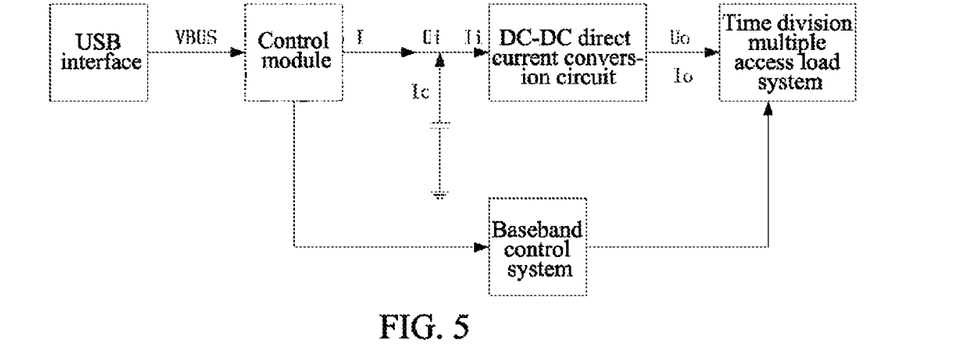
FIG. 5 is a schematic diagram of structure of the power supply device according to an application example.
Figure 6:
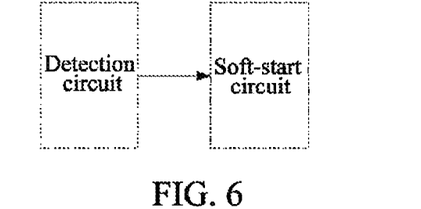
FIG. 6 is a schematic diagram of structure of a control module.

As shown in FIG. 5, the device is mainly composed of the following parts: a computer USB interface, a control module, a DC-DC direct current converter, a time division multiple access load system and a baseband control system. Wherein:

the computer USB interface supplies power to the terminal and performs data communication with the terminal; the power supply abilities of the current computer USB interfaces are all very strong, and through the actual measurement, all output currents can exceed 500 mA in a condition that the voltage of the USB interface is not less than 4.75V, and the power supply ability of USB interface of the desktop computer is greater than the power supply ability of USB interface of the notebook computer;

the control module is composed of a detection circuit and a soft-start circuit as shown in FIG. 6, an input terminal of a certain DC-DC converter carries all functions or part of functions of the control module in itself, and thus whether to add the control module or not depends on the situations; and the detection circuit in the control module has a function of setting a threshold voltage and detecting. During the normal working period, the detection circuit can perform detection on the voltage when the power is supplied in the USB interface, and when the time division multiple access load system works in a burst mode, input voltages of the USB interface and the DC-DC converter decline since the USB interface supplies instantaneous high current, and when the detection circuit detects that the voltage of the USB interface drops to a set threshold value (it can be set slightly higher than 4.75V such as 4.8V), a signal is output to the baseband control system promptly, to give an alarm.

The function of the soft-start circuit is prolonging the time of voltage climbing when the terminal powers on, limiting a current flowing through a large capacitance, and avoiding that an instantaneous large capacitance-to-ground short circuit generates the high current to damage the large capacitance and the direct current converter when the circuit is just electrified.

The function of the DC-DC direct current converter is converting the voltage of the USB interface to a working voltage required by the time division multiple access load system, and the DC-DC direct current converter and the large capacitance connected to the input terminal of the DC-DC direct current converter supply currents together when the time division multiple access load system works, and the large capacitance has an important role of stabilizing the voltage of the input terminal of the direct current converter.

Figure 7:
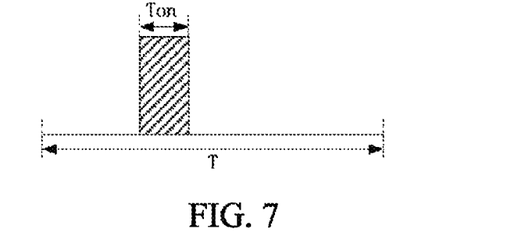
FIG. 7 is a schematic diagram of a working period of the time division multiple access system.

The time division multiple access load system is a radio frequency power amplifier load system working according to a certain time cycle on the terminal, and it has a load of operating characteristics in the burst mode, characteristics of the working period of the time division multiple access load system refer to FIG. 7, and its feature is working for a period of time and closing for a period of time within one cycle time. The power amplifier load can accept the baseband control system to perform power control on the power amplifier.

In order to guarantee the flexibility of working of the terminal system, the capacitance in FIG. 5 can be replaced with a capacitance group with the adjustable capacitance value, and a switch group is also required to coordinate with the capacitance group. The switch group is connected with the baseband control system, and decides whether to turn on or turn off the switch under the control of the baseband control system, so as to control a capacitance value of the capacitance group. The baseband control system adjusts the capacitance value along with the fluctuation of the voltage of the USB interface, and when the voltage of the USB interface drops to the threshold value, the switch is turned on, and the capacitance value increases. Through the foregoing analysis, the power supply abilities of USB interfaces of different computers differ a lot, and when the terminal is inserted in the USB interface of a certain model of notebook computer to work, and when the USB voltage drops to the threshold value, the switch is turned on and the number of capacitances supplying power to the power amplifier load increases, and more capacitances will be charged during the charging, thus requirements of the power amplifier load on the current are satisfied. When the voltage of the USB interface is far higher than the threshold value, a plurality of switches can be closed through the baseband control system, superfluous capacitances are reduced, and the requirements of the power amplifier load on the current can be satisfied with a small number of capacitances.

The baseband control system is mainly accepting an alarm signal transmitted from the detection circuit in the control module, and performing power control on the power amplifier load of the time division multiple access load system, and reducing the transmission power of the power amplifier load of the time division multiple access load system, thereby lowering the requirements of the power amplifier load on the current, and being able to control on-off of the switch components in the switch group. It prevents that the voltages of the input terminal of the direct current converter and the USB interface drop too low, thereby influencing the stability of working of the terminal and the stability of the USB power supply interface.

Figure 8:
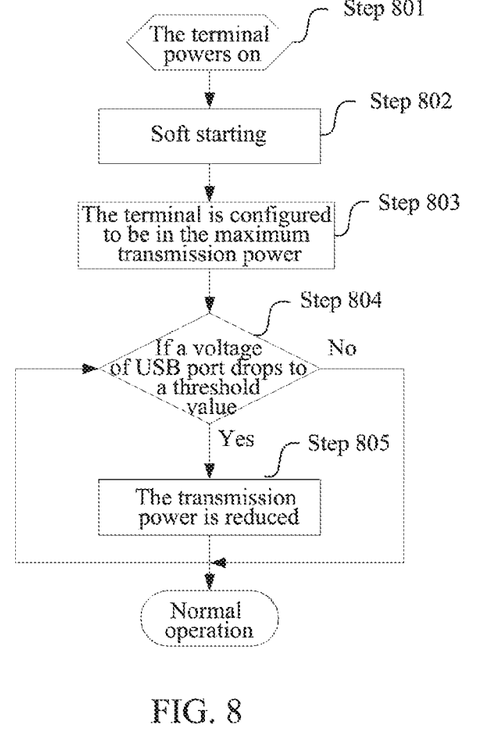
FIG. 8 is a flow diagram of the time division multiple access system working.

The working principle of the system is described in FIG. 8.

After the terminal powers on (step 801), the surge current at the power-on moment is reduced via the soft-start circuit (step 802), which ensures that the terminal safely finishes the power-on process. After the electrification is finished, the terminal is configured to work at maximum transmission power, that is, the power amplifier load in the time division load system can work at the maximum transmission power (step 803). The control module detects the voltage drop situation of voltage of the USB interface (step 804), and if the voltage drops to a set threshold value (in order to ensure the security, generally the threshold value is slightly higher than a threshold 4.75V, such as 4.80V and so on), the control module sends a signal to the baseband control system to give an alarm, and the baseband control signal will reduce the transmission power of the power amplifier of the time division multiple access load system (step 805), so as to decrease the demand of supplying power to the USB interface. This process will be repeatedly carried out until the interface power source reaches or slightly exceeds the set voltage threshold value, and at this point, it is indicated that the power level of power amplifier of the time division load system can ensure that the terminal is in a safe working state and the USB interface is also in a safe state.

The calculation of the large capacitance of the input terminal of the direct current converter will be described in detail with the example of the circuit shown in FIG. 5 below.

It is assumed that a typical value of the resistance is R when the control module works, an input voltage and an input current of the direct current converter are $U_i$ and $I_i$, an output voltage and an output current are $U_o$ and $I_o$, an efficiency of the direct current converter is $\eta$, a current of the capacitance supplying power is $I_c$, a voltage of the USB interface is VBUS, a typical normal value is 5V, a lower limit value is 4.75V when the drop occurs, and the maximum current allowed to be output by the USB interface is I, when the power amplifier does not work, a voltage of the energy-storage capacitance is UC1, and considering that the working current is very small and the impedance of the control module is extremely low at this point, the dropout voltage is ignored at this point, that is, the UC1 is approximate to the typical normal value of the USB interface which is 5V; and when the power amplifier works, a voltage mean value of the energy-storage capacitance is approximate to UC2:

$$UC1=5 \qquad \text{formula (2)}$$

$$UC2=4.75-IR \qquad \text{formula (3)}$$

The following equation is valid according to the conversion efficiency formula of the direct current power converter:

$$U_i \times I_i \times \eta = U_o \times I_o \qquad \text{formula (4)}$$

The current supplied by the large capacitance is $I_c$, and the following equation is valid:

$$I_c = I_i - I \qquad \text{formula (5)}$$

With regard to a fixed terminal system, the current required by the load namely the current $I_o$ required by the time division multiple access load system, the output voltage required by the load namely the voltage $U_o$ required by the time division multiple access load system, the direct current conversion efficiency η and a working scope of the input voltage of the direct current converter can be all acquired through simple calculation by checking a data book, thus a relation formula between the current supplied by the large capacitance $I_c$ and the power supply ability of USB interface can be calculated with the equations (2)-(5):

$$I_c = \frac{U_0 \times I_0}{U_i \times \eta} - I \quad \text{formula (6)}$$

For the charge output by the large capacitance within the Ton time (the value is fixed in the time division multiple access system, and it is generally 577 us in the GSM) is ΔQ, the following formula is valid:

$$\Delta Q = I_c \times Ton \quad \text{formula (7)}$$

A voltage drop ΔU on the capacitance within the Ton working time is approximately regarded as:

$$\Delta U = UC1 - UC2 \quad \text{formula (8)}$$

The capacity of the large capacitance is set as C, and the following equation is valid:

$$C = \frac{\Delta Q}{\Delta U} \quad \text{formula (9)}$$

The required capacity of the large capacitance C can be obtained with the formulas (2)-(8):

$$C = \frac{\left(\frac{U_0 \times I_0}{U_i \times \eta} - I\right) \times Ton}{UC1 - UC2} \quad \text{formula (10)}$$

UC1 is an initial voltage of the capacitor when the time division multiple access load system does not work, and it can be approximately equal to a typical voltage of the USB interface, and UC2 is a voltage of the capacitor when the time division multiple access load system works. The above calculation process is calculated in an ideal state, and a capacitance value in the actual model selection is preferably greater than the theoretical calculated value.

A direct current converter bq24165 of the Texas Instruments Incorporated is taken as an example, a conversion efficiency η of the component is 90%, the bq24165 supplies power to a GSM900 MHz load, a current required by the load with 3.6V power supply under the 33 dBm is 1.8 A, it can be known that: $U_o$=3.6V, $I_o$=1.8 A, η=90%, $U_i$=4.75V, Ton=0.577 ms, UC1=5 v, in order to calculate conveniently, the voltage drop on the control module is ignored, and UC2=$U_i$=4.75 v at this point. Through the formula (10), it can be calculated that the required large capacitance is:

$$C = \frac{\left(\frac{U_0 \times I_0}{U_i \times \eta} - I\right) \times Ton}{UC1 - UC2} =$$

-continued $$\frac{\left(\frac{3.6 \times 1.8}{4.75 \times 0.9} - I\right) \times 0.577 \times 10^{-3}}{5 - 4.75} = (1.516 - I) \times 2.308 \times 10^{-3} F$$

The capacitance calculated according to the formula is certainly greater than the capacitance when considering that the voltage drop exists on the control module, thus the capacitance value certainly satisfy the requirements of the time division multiple access load system on the large capacitance.

Through the calculation according to the standard maximum 500 mA output by the USB interface specified in the general USB2.0 protocol, it can be obtained that the required massive capacitance is 2.34 mF. Considering that the power supply abilities of the USB interfaces of the current computer interfaces are all very strong, the output current of an MAC notebook with poor ability of carrying loads in the actual measurement is also 700 mA, it can be obtained that the required massive capacitance is 1.88 mF through calculation, similarly, with regard to the computer supporting the USB3.0 interface, the power supply ability of the USB interface is 900 mA, and it can be calculated that the required massive capacitance is at least 1.42 mF. When the capacitance of the power amplifier load system has an adjustable capacitance group, the number of capacitances can be controlled according to differences of power supply abilities of the USB2.0 and USB3.0, thus it is unnecessary to revise and design the terminal again, and the power supply problem can be solved with the adjustable capacitance group. It can be seen from this example that, the stronger the power supply ability of the USB interface is, the smaller the value of the massive capacitance required to be added is.

With the power supply device and method for the time division multiple access load system of the present application, a disadvantage of calculating the massive capacitance in the related art is overcome, in combination with an actual situation of the USB interface power supply, not only the reliabilities of the USB interface and the direct current converter during the normal operation are considered, but also the reliability problem at the power-on moment after adding the massive capacitance is considered, the calculation method is extended, while the power supply of the terminal load is satisfied, the consideration of costs is also concerned, and since it gives full play to the power supply ability of the computer USB interface, the massive capacitance required by the terminal side will decrease, which reduces the design costs of the terminal. Moreover, the present application is not only applicable to the USB interface supporting the USB2.0 protocol, and it is also applicable to the USB interface supporting the USB3.0 protocol.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module.

The present application is not limited to any combination of hardware and software in a specific form.

Certainly, the present application can still have other various examples, the skilled familiar to the art can make various corresponding changes and transformations according to the present application without departing from the spirit and essence of the present application, and these corresponding changes and transformations shall all fall into the protection scope of the appended claims of the present application.

INDUSTRIAL APPLICABILITY

With the device and method of the present application, the minimum capacity of capacitance required by the input terminal of the DC-DC converter is determined by monitoring the voltage of the USB interface (not less than a standard specification value), which guarantees reliabilities of the working of the computer USB interface and working of the terminal while considering costs of the whole machine. By using the method and device of the present application, it is unnecessary to concern whether the USB interface supports the USB2.0 protocol or the USB3.0 protocol, and it is only required to consider an actual power supply ability of the USB interface, which has a practical significance of universal applications.

What is claimed is:

1. A USB interface power supply device for a time division multiple access load system, comprising: a USB interface, a soft-start circuit and a DC-DC direct current conversion circuit that are connected in sequence, wherein, an output of the DC-DC direct current conversion circuit supplies power to the time division multiple access load system, and the USB interface power supply device further comprises a capacitor, wherein:
a first end of the capacitor is connected between the soft-start circuit and the DC-DC direct current conversion circuit, a second end of the capacitor is set to be grounded, and the capacitor is used for limiting an input current of the DC-DC direct current conversion circuit;
a capacitance value of the capacitor is decided according to voltages of the capacitor when the time division multiple access load system works and does not work, a maximum current allowed to be output by the USB interface, an input voltage of the DC-DC direct current conversion circuit, a voltage and a current required by the time division multiple access load system, and working time of the time division multiple access load system within one time cycle,
wherein a capacitance value of the capacitor being decided according to voltages of the capacitor when the time division multiple access load system works and does not work, a maximum current allowed to be output by the USB interface, an input voltage of the DC-DC direct current conversion circuit, a voltage and a current required by the time division multiple access load system, and working time of the time division multiple access load system within one time cycle comprises:
the capacitance value being obtained through calculation with a following formula:

$$C = \frac{\left(\frac{U_0 \times I_0}{U_i \times \eta} - I\right) \times \mathrm{Ton}}{UC1 - UC2};$$

wherein, UC1 is an initial voltage of the capacitor when the time division multiple access load system does not work, UC2 is a voltage of the capacitor when the time division multiple access load system works, $U_0$ is the voltage required by the time division multiple access load system, $I_0$ is the current required by the time division multiple access load system, $U_i$ is the input voltage of the DC-DC direct current conversion circuit $\eta$ is a conversion efficiency of the DC-DC direct current conversion circuit, I is the maximum current allowed to be output by the USB interface, and Ton is the working time of the time division multiple access load system within one time cycle.

2. The device according to claim 1, wherein,
the USB interface power supply device further comprises a detection circuit and a baseband control circuit, wherein:
the detection circuit is configured to: be located between the USB interface and the soft-start circuit, and detect whether an output voltage of the USB interface is lower than a preset threshold value; and
the baseband control circuit is configured to: connect with the detection circuit at one end, and connect with the time division multiple access load system at the other end, and when the detection circuit detects that the output voltage of the USB interface is lower than the preset threshold value, reduce transmission power of the time division multiple access load system.

3. The device according to claim 2, wherein,
the capacitor comprises a capacitance group and a switch group, one end of the capacitance group serves as the first end of the capacitor, the other end of the capacitance group serves as the second end of the capacitor, the switch group is connected with the baseband control circuit, and the switch group turns on or turns off internal switch components of the switch group to control a capacitance value of the capacitance group according to control of the baseband control circuit.

4. The device according to claim 3, wherein,
the capacitance group comprises at least two parallel capacitances, and each capacitance is connected with a switch component in series, and all switches constitute the switch group.

5. A USB interface power supply method for a time division multiple access load system, comprising:
after soft starting, a capacitor limiting an input current of a DC-DC direct current conversion circuit, wherein a capacitance value of the capacitor is decided according to voltages of the capacitor when the time division multiple access load system works and does not work, a maximum current allowed to be output by a USB interface, an input voltage of the DC-DC direct current conversion circuit, a voltage and a current required by the time division multiple access load system, and working time of the time division multiple access load system within one time cycle; and
the DC-DC direct current conversion circuit performing voltage conversion, and supplying power to the time division multiple access load system,
wherein a capacitance value of the capacitor being decided according to voltages of the capacitor when the time division multiple access load system works and does not work, a maximum current allowed to be output by a USB interface, an input voltage of the DC-DC direct current conversion circuit, a voltage and a current required by the time division multiple access load system, and working time of the time division multiple access load system within one time cycle comprises:

the capacitance value being obtained through calculation with a following formula, $$C = \frac{\left(\frac{U_0 \times I_0}{U_i \times \eta} - I\right) \times \text{Ton}}{UC1 - UC2};$$

wherein, UC1 is an initial voltage of the capacitor when the time division multiple access load system does not work, UC2 is a voltage of the capacitor when the time division multiple access load system works, $U_0$ is the voltage required by the time division multiple access load system, $I_0$ is the current required by the time division multiple access load system, $U_i$ is the input voltage of the DC-DC direct current conversion circuit, $\eta$ is a conversion efficiency of the DC-DC direct current conversion circuit, I is the maximum current allowed to be output by the USB interface, and Ton is the working time of the time division multiple access load system within one time cycle.

6. The method according to claim 5, wherein, the method further comprises: detecting whether an output voltage of the USB interface is lower than a preset threshold value; and if the output voltage of the USB interface is lower than the preset threshold value, reducing transmission power of the time division multiple access load system.

7. The method according to claim 6, wherein, the method further comprises: after determining the capacitance value of the capacitor, by controlling on-off of switch components in a switch group connected with the capacitor, adjusting the capacitance value of the capacitor.

8. The method according to claim 7, wherein, the capacitor comprises at least two parallel capacitances, and each capacitance is connected with a switch component in series.

\* \* \* \* \*